(No Model.) 8 Sheets—Sheet 1.

H. M. NEER.
CASH REGISTER.

No. 490,304. Patented Jan. 24, 1893.

Fig. 1

Witnesses
Ira C. Koehne
Frank Watt

Inventor
Harry M. Neer
By Staley and Shepherd
Attorneys

(No Model.)　　　　　　　H. M. NEER.　　　　8 Sheets—Sheet 3.
CASH REGISTER.

No. 490,304.　　　　　　　Patented Jan. 24, 1893.

Witnesses
Ira C. Koehne
Frank Watt

Inventor
Harry M. Neer
By Staley & Shepherd
Attorneys (No Model.) 8 Sheets—Sheet 6.

H. M. NEER.
CASH REGISTER.

No. 490,304. Patented Jan. 24, 1893.

Witnesses
Ira C. Koehne
Frank Watt

Inventor
Harry M. Neer
By Shepherd
Attorneys (No Model.) 8 Sheets—Sheet 7.

H. M. NEER.
CASH REGISTER.

No. 490,304. Patented Jan. 24, 1893.

Witnesses
Ira C. Koehne
Frank Watt

Inventor
Harry M. Neer
By Staley & Shepherd
Attorneys

UNITED STATES PATENT OFFICE.

HARRY M. NEER, OF SPRINGFIELD, OHIO, ASSIGNOR OF TWO-THIRDS TO O. W. KELLY AND THOMAS REYNOLDS, OF SAME PLACE.

CASH-REGISTER.

SPECIFICATION forming part of Letters Patent No. 490,304, dated January 24, 1893.

Application filed November 16, 1891. Serial No. 412,021. (No model.)

*To all whom it may concern:*

Be it known that I, HARRY M. NEER, a citizen of the United States, residing at Springfield, in the county of Clark and State of Ohio, have invented certain new and useful Improvements in Cash-Registers, of which the following is a specification.

My invention relates to improvements in cash registers, and also relates in its nature to improvements upon the devices shown and described in my pending application Serial No. 394,785, filed June 1, 1891.

The object of my invention is to simplify the constructions heretofore employed in cash registers and produce a machine in which the various operations of registering and indicating are positive.

My invention consists in the various constructions and combinations of parts hereinafter described and pointed out in the claims.

In the accompanying drawings

Like parts are indicated by similar letters and figures of reference in the several views.

In the said drawings A A, represent the outer casing of the machine. A' A', represent the main frame contained within the casing and in which all the operating parts are journaled or supported.

In the present machine as in the one described in my previous application, a separate series of operating mechanism is used for each denomination to be registered: that is to say a separate series of registering devices is used for dollars, dimes and cents. The respective registering devices being substantially duplicates and arranged in successive order from right to left within the casing so that the amounts indicated will be read in their proper numerical order from left to right on the indicators. I shall, therefore, proceed to describe one set or series of registering devices, which description shall, in all its general features, apply equally to each set or series of devices. The transferring or adding mechanism which transfers an amount from one denomination to that of a higher denomination and the locking device common to all the respective series, being afterward referred to.

Each series or set of registering devices is provided with nine keys $a$, numbered from 1 to 9 respectively and each key is connected at its lower end to one arm of a bell crank lever $a'$, journaled on a shaft 1, extending transversely across the main frame A', and common to all the series. The other arm of the bell crank lever $a'$, is connected by a rod $a^2$, to a spring catch $a^3$, secured at its lower end to a cross bar $a^4$, of the frame, common to all the series and provided with an engaging notch or shoulder $a^5$, which engages one of a series of horizontal bars $a^6$, provided with a downwardly projecting stem $a^7$, resting in a tube or sleeve $a^8$, in which it is adapted to reciprocate, said sleeve being stationary in the frame $a'$, and surrounded by a spring $a^9$, which bears against the under side of the cross bar $a^6$ and tends to press the same upwardly when released by the spring catch $a^3$. Each of the cross bars $a^6$, is also provided with an upwardly projecting pin $a^{10}$, which rises vertically therefrom with its upper end resting in an opening formed in a horizontal plate $a^{11}$, extending from side to side of the main frame and being common to all the series. Resting loosely on each of the cross bars $a^6$, and preferably near the end thereof is a stem $a^{12}$, which carries at its upper end an indicator $a^{13}$, bearing a number corresponding to the key connected to said bar. The respective stems $a^{12}$ being curved at their ends and joined to the respective indicators in such a manner that said indicators shall stand one behind the other when in their normal positions in a well known manner. Each of the indicator stems $a^{12}$, is provided with a projection $a^{14}$, adapted, when elevated by the elevation of the bar $a^6$, to be engaged by a pivoted frame or cross bar $a^{15}$, common to all the indicators of that set or series. (See Figs. 4 to 14 for detail.)

On the lower side of the transverse plate $a^{11}$, are formed projecting ears $a^{16}$, to which are pivoted T-shaped levers $a^{17}$, one for each set or series of registering devices. The transverse head $a^{18}$, of each of said levers being adapted to extend across and above all the horizontal bars $a^6$, of a given series. To the other end of said lever $a^{17}$ is pivoted a pin or projection $a^{19}$, which normally projects through the plate $a^{11}$, being held in this position by the weight of the transverse head $a^{18}$, of the lever $a^{17}$, which tends to force said pin upwardly through the plate.

Immediately above the plate $a^{11}$, is a T-shaped rack B, the head of which normally engages the pin $a^{19}$. This rack is supported in a frame B', pivoted or journaled at its front end on a shaft 2, extending across the main frame and common to all the sets or series. Above each of the racks is a registering wheel C, normally out of engagement with said rack but provided with teeth adapted to mesh with the teeth in said rack. The rack B, is provided at its rear end on one side with a projecting roller $b$, which contacts with a pivoted lever $b'$, journaled or pivoted on a shaft 3. To this lever is attached a spring $b^2$, the opposite end of which is connected at a convenient point to the front part of the main frame A'.

Figure 1:
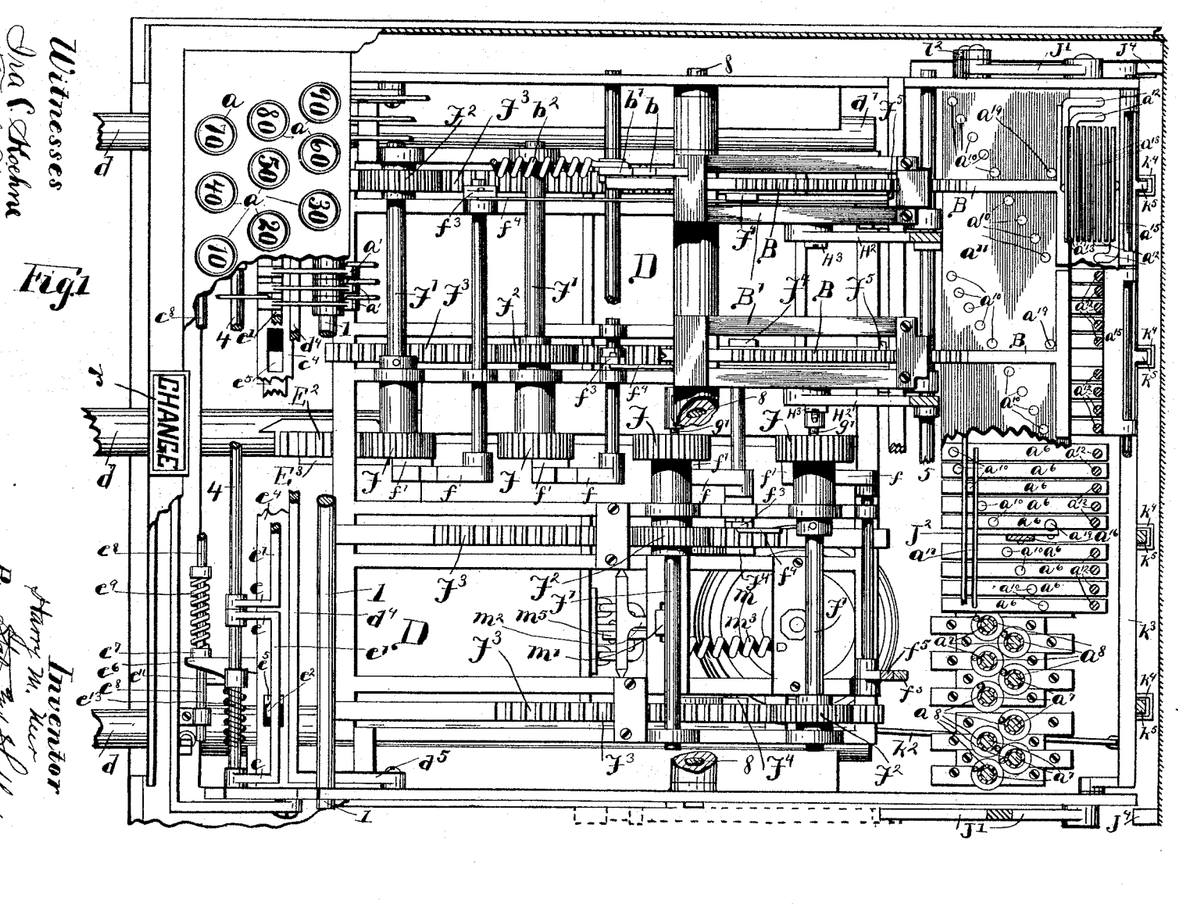
Figure 1 is a plan view of a machine embodying my invention with the outer casing removed, some of the parts being broken away and removed so that the view illustrates the respective series of mechanisms from right to left on four successive planes.
Figure 2:
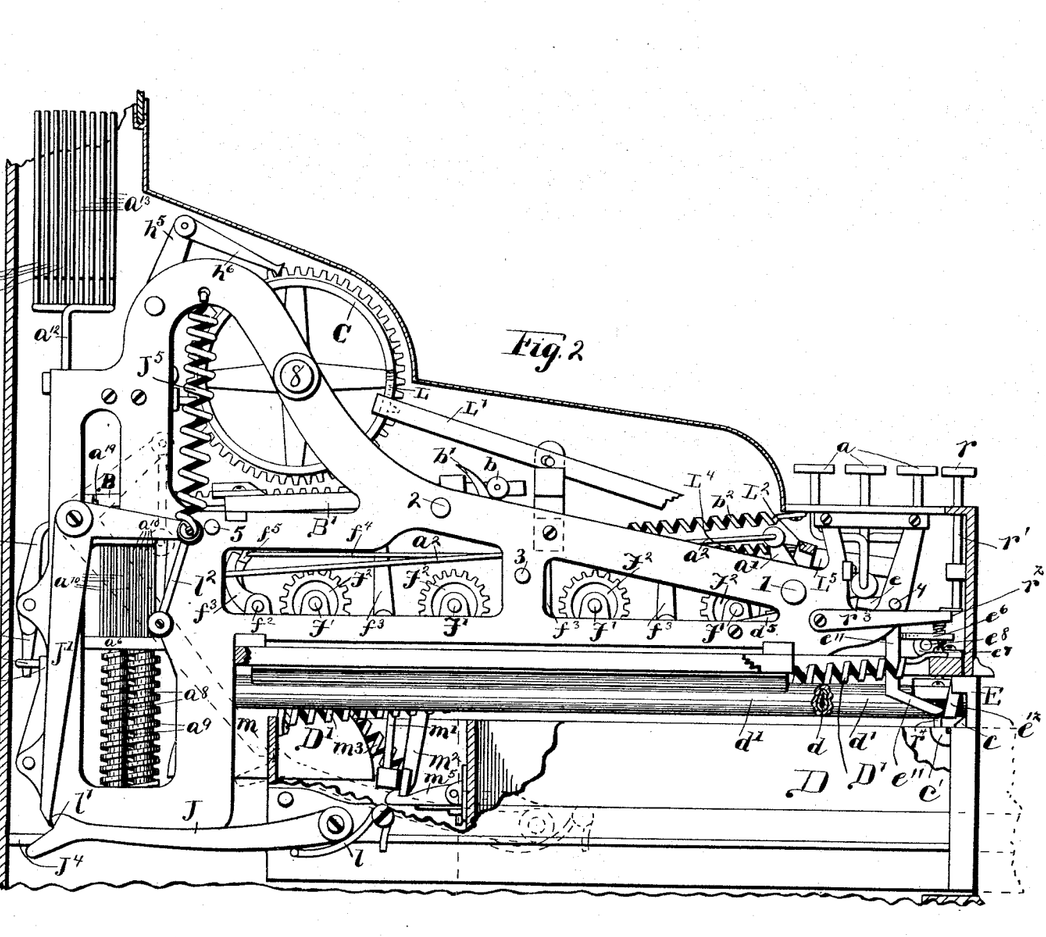
Fig. 2 is a side elevation view of the same with the casing removed and some of the parts broken away.

It should be mentioned that the stop pins $a^{10}$, on the respective horizontal bars $a^6$, for each series of keys are arranged in successive order from front to rear and from right to left of the machine, as shown in Fig. 1, so that each pin from right to left stands slightly in advance of the next succeeding one. It will be seen now that as one key is depressed, the bar $a^6$, corresponding to said key will be released and forced upwardly by its spring $a^9$, and carrying with it the indicator $a^{13}$, and stop-pin $a^{10}$. As the bar approaches the limit of its upward stroke it contacts with the T-shaped lever $a^{17}$, which withdraws the pin $a^{19}$, through the plate $a^{11}$, thus releasing the rack B, and permitting it to be drawn forward by the spring $b^2$, until it contacts with the stop-pin $a^{10}$, which was elevated through the plate $a^{11}$, by the vertical movement of the bar $a^6$. (See Fig. 4.)

It should be noted that the stop-pins stand at a distance apart from front to rear equal to one tooth in the rack B, the stop-pin being correspondingly removed from the retaining pin $a^{19}$. The depression of any key, therefore, permits a forward movement of the rack, as thus described, the number of teeth corresponding to the number of the key depressed.

It should be stated that the stems connecting the keys $a$, to the bell-crank levers $a'$ are so curved as to connect with the bell-crank levers in the same vertical plane, while the keys, for convenience, are arranged in any suitable manner upon the key board. (See Fig. 5.)

Figure 13:
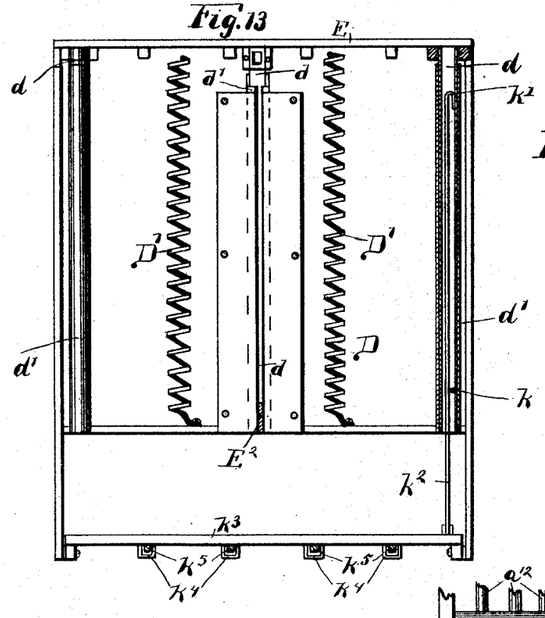
Fig. 13 is a plan view partly in section of the cash drawer and the auxiliary frame for operating the registering mechanism.
Figure 14:
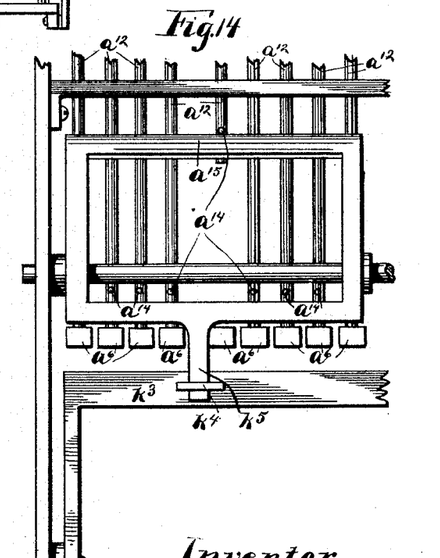
Fig. 14 is a rear view of a portion of the indicating mechanism and the devices for controlling the same.
Figure 15:
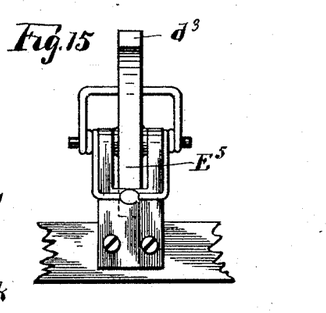
Fig. 15 is a plan view in detail of the pivoted catch for the auxiliary frame.
Figure 16:
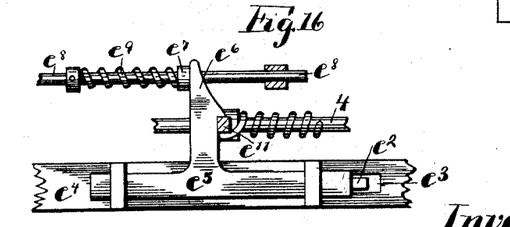
Fig. 16 is a bottom plan view showing the key locking devices in detail.
Figure 17:
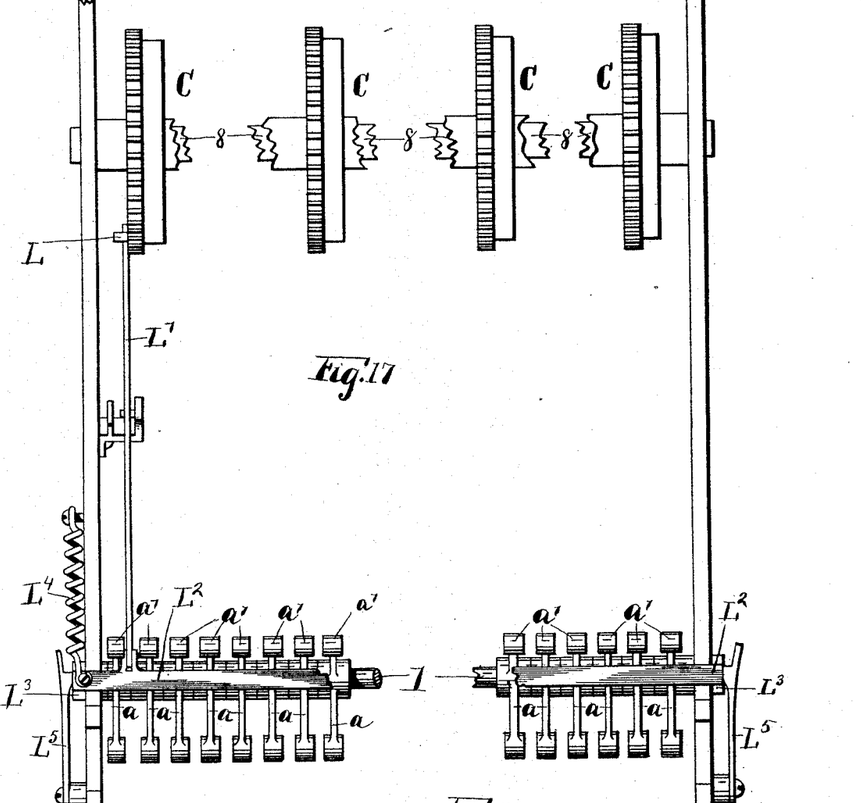
Fig. 17 is a partial plan view showing the arrangement of the permanent locking devices which are operated when the machine has been used to its full capacity.

In the lower part of the case and below the operating mechanism is the cash receptacle preferably in the form of a drawer D, adapted to slide on suitable ways or bearings in the frame, so as to be moved out of or into said case. The drawer is held in its normal position by small spring-catches $c$ (see Fig. 5) two of which are preferably employed one at each side of the drawer. These spring-catches are arranged in the front of the drawer and are adapted to engage with an auxiliary sliding frame, arranged just above the drawer D, and provided with backwardly extending tubular bearings $d$, which fit in corresponding tubes or sleeves $d'$, in the main frame. (See Figs. 2, 3, 4 and 5 for detail.) One of the tubular bearings $d$, contains a spring E', which preferably extends the entire length of said bearing and bears at its rear end against a portion of the main frame, the spring being compressed in its normal position so that when the auxiliary frame is released the spring will force the same outwardly. This auxiliary frame E, is held in its normal position by a pivoted latch $E^5$, adapted to engage in a notch or recess $d^2$, in the top of the front portion of said frame. The pivoted latch $E^5$, is provided with an upwardly extending spur or projection $d^3$, which rests in contact with a transverse bar $d^4$, which extends entirely across the main frame immediately under the horizontal arms to the respective bell-cranks $a'$, said bar being supported at each end by arms $d^5$, pivoted at $d^6$, to the respective sides of the main frame A' (see Fig. 5 for detail). It will be seen, therefore, that as any key in any series is depressed the bar $d^4$, is depressed, thus withdrawing the pivoted latch $E^5$, from the notch $d^2$, in the auxiliary frame E; the said frame is thus released and forced outwardly by the spring E'. The drawer D, being retained in its normal position by the spring-catches $c$, which rest in contact with said auxiliary frame, is also released and drawn outwardly by springs D', which are connected at one end to the back of said drawer and at the opposite end to the forward part of the frame, as indicated in Fig. 13. The drawer and auxiliary frame are thus simultaneously opened, the frame being preferably constructed to conform to the outlines of the drawer, the front of the frame being flush with the front of the drawer.

Figure 5:
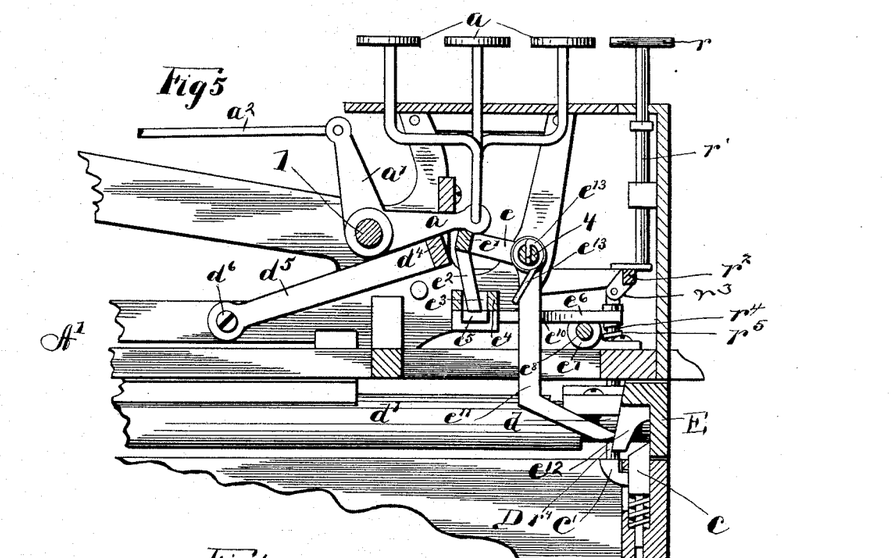
Figs. 5 and 6 are respectively a sectional elevation and front view of the operating keys and their controlling mechanism in detail.
Figure 6:
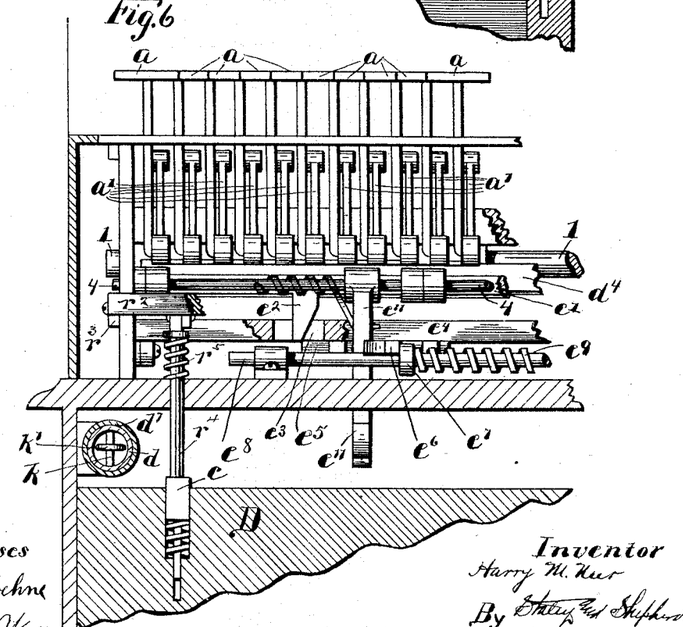
Figure 7:
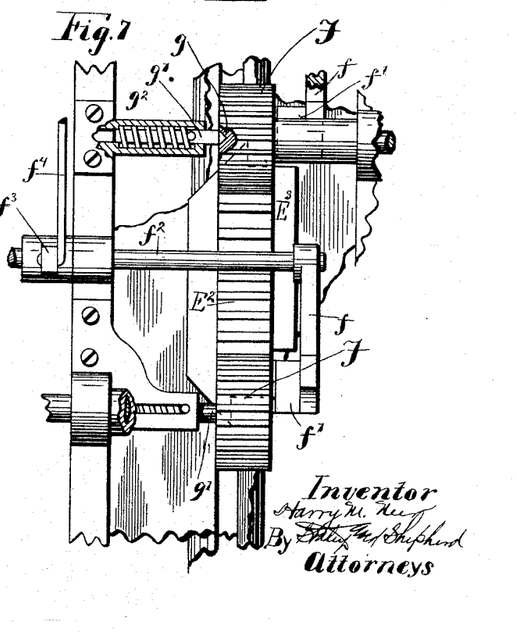
Fig. 7 is a plan view partly in section of some of the registering mechanism in detail.
Figure 8:
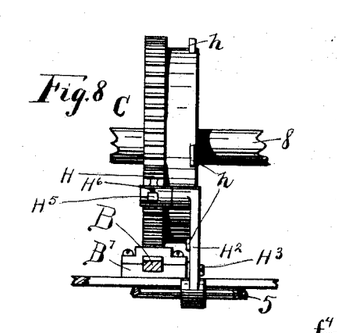
Figs. 8 and 9 are respectively a rear and detail view of the stopping devices employed in connection with the registering wheels.
Figure 9:
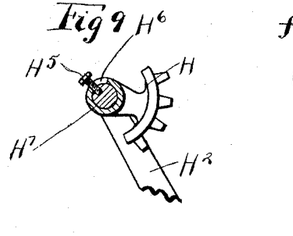
Figure 10:
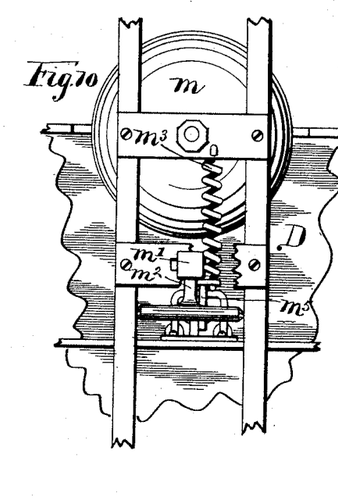
Figs. 10 and 11 are a plan and side elevation respectively of the bell or alarm mechanism.
Figure 11:
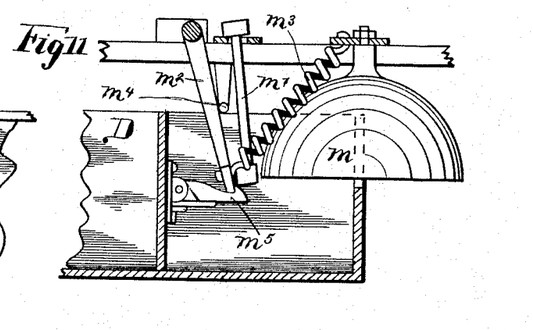

Under each series of keys is a U-shaped bar or frame $e$, the extending arms of which are journaled on a transverse shaft 4, common to all the series. This bar or frame $e$, rests with its center portion $e'$, in contact with each of the horizontal arms of the bellcrank $a'$, of that series and in proximity to the bar $a^4$, which operates the locking lever of the auxiliary frame. Extending downwardly from the bar $e'$, is a finger $e^2$, which passes through an opening $e^3$, in a transverse bar $e^4$, also common to all the series of the machine. This finger $e^2$, is beveled on one side, as shown in Fig. 6, and rests with its end adjacent to the end of a sliding bolt $e^5$, immediately under and supported in bearings over the transverse bar $e^4$. This sliding bolt is formed integrally with a projecting arm $e^6$, which projects laterally therefrom with its outer end resting in contact with a collar $e^7$, on a small sliding bar $e^8$, supported in suitable bearings and provided with a spring $e^9$, which presses against said collar and serves to press the bolt $e^5$, to its normal position, as shown in Fig. 6. The projecting arm $e^6$, is provided with a notch or engaging shoulder $e^{10}$, which normally engages an L-shaped finger $e^{11}$, also pivoted on the shaft 4, and pressed downwardly with its lower end in contact with a projection $e^{12}$, on the auxiliary frame E, by a spring $e^{13}$. The said spring $e^{13}$, being also adapted to engage the U-shaped bar $e$, and force it upwardly to its normal position. The projecting arm $e^6$, of the sliding bolt $e^5$, is so formed that when the finger $e^{11}$, is released thereby and is moved forward by the opening of the auxiliary frame, the sliding bolt $e^5$, is permitted to move a greater distance in the direction in which it is pressed by the spring $e^9$, than when the arm is in its normal position, as shown in Fig. 5. The result of this construction is, that when the auxiliary frame is opened by depressing a key, the finger $e^2$, pressing against the end of the sliding bolt $e^5$, moves the arm $e^6$ temporarily out of engagement with the L-shaped finger $e^{11}$, so that as the auxiliary frame is opened the L-shaped finger pressed downwardly by the spring $e^{13}$, follows the auxiliary frame to the position shown in Fig. 3, which permits the sliding bolt $e^5$, to move along the transverse bar $e^4$, until it rests directly under the finger $e^2$, after said finger has been returned to its normal position. By this operation all the keys of that series become locked because a further depression of any key is prevented by the contact of the sliding bolt $e^5$, and the finger $e^2$. As the sliding frame is moved back to its normal position the projection $e^{12}$, contacting with the finger $e^{11}$, presses the arm $e^6$, and the sliding bolt $e^5$, to their normal positions, where they are retained, as before described.

I will now proceed to describe the mechanism for positively operating the registering devices. After a key has been depressed in one or more series, thus releasing the auxiliary frame and cash drawer as well as the registering rack devices, as before described.

Secured to the central bearing tube $d$, of the auxiliary frame E, which tube contains the operating spring E', is a rack segment $E^2$, which projects upwardly through a slotted opening $d^7$, in the top of the stationary bearing tube $d'$, in which the tube $d$, slides. This rack segment $E^2$, is adapted, as the auxiliary slide frame E, is reciprocated, to contact successively with a series of pinions F, and partly revolve the same, one of said pinions being employed for each set of registering devices and arranged in successive order in the travel of the rack segment $E^2$, as shown in Fig. 1. Each of these pinions F, is mounted on a shaft F', which also carries a pinion $F^2$, engaging with a rack $F^3$, two of the shafts being preferably extended in one direction from the center of the machine, and the other two (there being four in all) being extended to an opposite direction, and the respective pinions $F^2$, being so located on the said shafts that the racks $F^3$, are arranged in successive order from right to left of the machine and immediately under the registering racks B. On each of the racks $F^3$, is a projecting arm $F^4$, which extends upwardly at the side of, and in close proximity to the registering rack B. A laterally projecting stud or pin $F^5$, on the registering rack B, is adapted to contact with the arm $F^4$, as said rack is moved by its rack and pinion from front to rear by the closing of the cash drawer and the auxiliary operating frame.

To provide for throwing the respective registering racks into mesh with the respective registering wheels as said racks are thus moved from front to rear, I employ on the rack segment $E^2$, a camway $E^3$, and at one side of and in close proximity to each of the pinions F, I provide a pivoted arm $f$, having a laterally extending cam projection $f'$, the contour of which is such that the camway $E^3$, contacts with the bottom thereof in moving from front to rear and thus presses the said arm upwardly, the camway being adapted to engage the top of said projection when passing from front to rear and thus force the said arms $f$, upwardly. Each of the arms $f$, is secured to a shaft $f^2$, journaled in suitable bearings and provided also with an extending arm $f^3$, to which is attached a connecting rod $f^4$. This connecting rod $f^4$, is attached at its opposite end to a T-shaped oscillating lever $f^5$, pivoted or journaled on a transverse frame shaft 5, immediately under the registering rack frame B', so that a downward movement of the arm $f$, produces an upward movement of the T-shaped arm or lever $f^5$, bringing said arm in contact with the rack-frame B′, thus raising said rack-frame on its pivoted center so as to force the registering rack B, into engagement with its registering wheel.

The result of the constructions thus described, it will be seen, causes the respective registering racks that have been released by the depression of a key in the series to which it belongs, to be successively raised into engagement with the registering wheels and moved backwardly to their normal positions as the auxiliary frame E is returned to its normal position, after having been released and extended by the spring E′.

Figure 4:
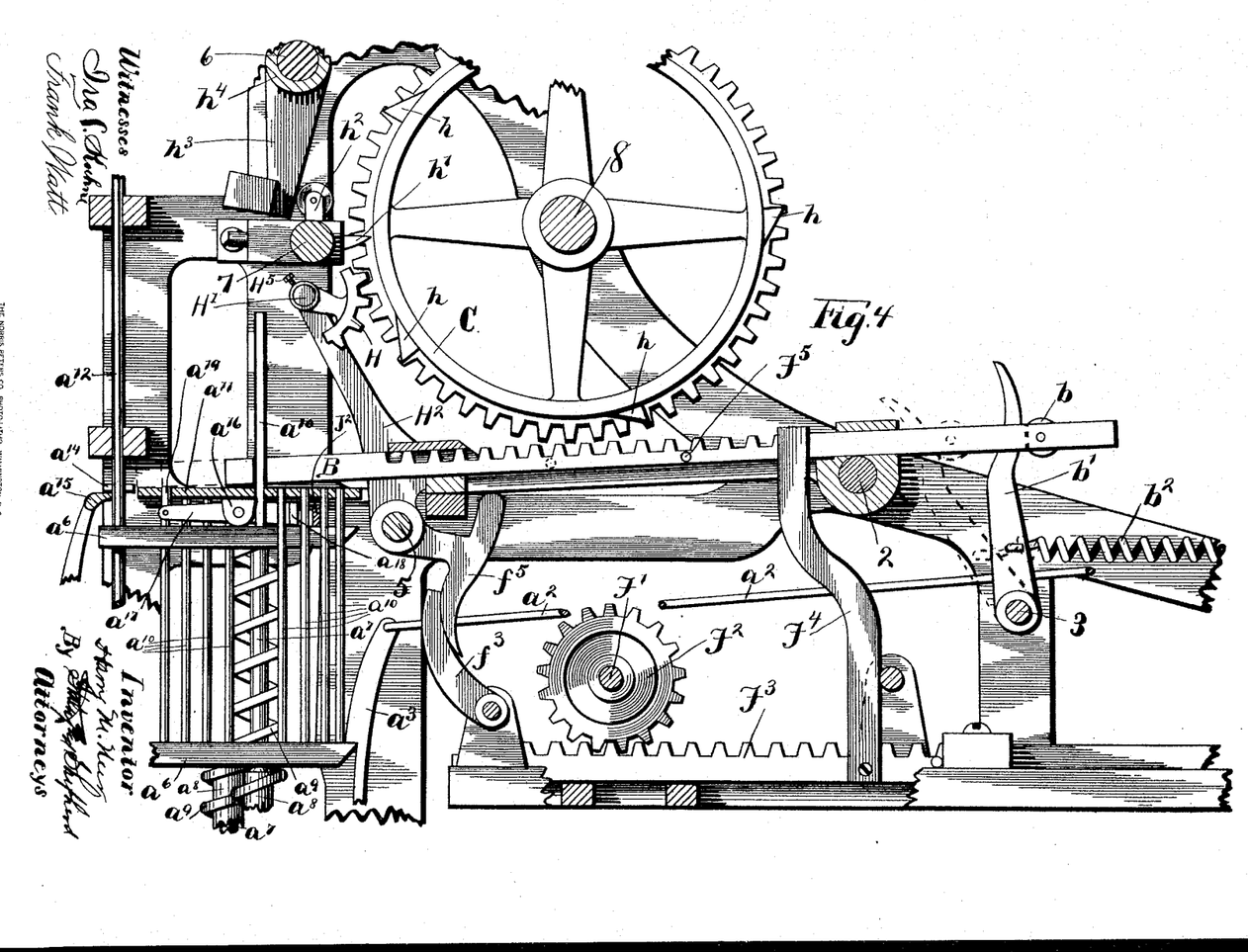
Fig. 4 is an enlarged view of the registering wheel and its registering mechanism in detail.

It will be understood that the pinions F and F′, and the rack F³, of all the series, travel a uniform distance at each outward and inward stroke of the auxiliary frame, the distance traveled being sufficient to carry the registering rack over the entire space of nine teeth, the said registering racks, however, being stopped in the outward movement by the stop-pins, are caused to engage the registering wheels at such a point that when forced back to their normal positions by the movement of the said auxiliary frame, the said registering wheels will be carried the number of teeth corresponding to the number of the key depressed. In the registering mechanism corresponding to the cents series, the connecting rod $f^4$, is dispensed with between the arms $f^3$, and the T-shaped lever $f^5$, the movement in this case being accomplished by the direct contact between the respective arms $f^3 f^5$, as shown in Fig. 4.

To provide for holding the respective pinions F, in the proper position at the limit of their travel in either direction, I form in the side of each of said pinions a conical seat or notch $g$, adapted to be engaged by a similarly shaped spring bolt $g'$, supported in a suitable bearing $g^2$, in the main frame. This spring bolt being adapted to be pressed back out of engagement with said wheel as said rack engages the teeth with the pinion in either direction, but adapted to hold said pinion against any accidental movement, so that the teeth of the rack segment shall always engage the teeth of the pinion at the same point and produce the same amount of travel at each outward and inward stroke.

As before stated the inward movement of the auxiliary frame E, produces an inward movement of all the racks B, which have been released, and this movement of the respective racks and consequently of the registering wheels is produced in successive order, the devices representing dollars being first moved, then the dimes then the cents. It should be stated that the camway E³, on the rack segment E², is made of such length that the arm $f$, is operated thereby, during such time as the rack segment engages with the pinion F, only, so that as soon as the movement of the registering rack is completed, the pivoted frame E, supporting said rack is released and drops to its normal position, thus disengaging the registering rack from the registering wheel, as soon as its movement is completed.

To provide for transferring the amounts from one registering wheel to the registering wheel of the next higher denomination, when a sufficient number of units on the lower wheel have been counted to make a unit of the higher, I employ a device substantially the same as set forth in my prior application referred to. Each of the registering wheels C, is provided at intervals of ten teeth with engaging projections which, as the wheel is revolved, contact with a sliding rod or bar $h'$, carrying a friction roller $h^2$, which in turn contacts with the end of a projecting arm $h^3$, journaled on a frame shaft 6, by means of a sleeve $h^4$, which extends along said shaft to a point opposite the next succeeding registering wheel, at which point it is provided with an arm $h^5$, having attached thereto a pivoted pawl $h^6$, which engages with the teeth of the next succeeding wheel. It will be seen that as any registering wheel is moved ten notches, the engaging projections $h$, through the mechanism described, produces a movement of one notch of the next succeeding wheel.

It will be understood that each of the registering racks when in engagement with its registering wheel is moved to the limit of its backward movement and stopped prior to the time it is discharged from said registering wheel, so that each registering wheel is moved the exact number of teeth represented by the key depressed and no further, any momentum of the said wheel being overcome by the rack which is in engagement therewith.

To provide for positively stopping each of the registering wheels when an amount is transferred thereto from one of the wheels of a lower denomination, I provide for each of the registering wheels a small gear segment H, journaled to and capable of a limited movement on a stud H′, on the end of a bell-crank arm or lever H², which arm is journaled or pivoted at its center on the frame shaft 5, and pivotally connected at its other extremity by a screw H³, to the frame B′. This screw H³, passes through a slotted opening H⁴, in the end of the frame H², so that an upward movement of the rack frame B′, produces an oscillating movement of said bell-crank arm H², which carries the segment H, pivoted to the upper end of said arm, away from and out of engagement with the registering wheel. The segment H, as before stated, is pivoted to the stud H′, so as to have a limited movement thereon. This is accomplished by a set-screw H⁵, which passes through a slotted opening H⁶, in the sleeve of said segment and into the stud H′. As the rack-frame B′, is released and drops to its normal position, as shown in Fig. 4 the segment H, is thrown in mesh with the registering wheel. The segment H, is made of such length that when thus engaged with the registering wheel the movement of one notch or tooth of said registering wheel will cause the end of the said segment to contact with a frame-shaft or bar 7, and thus positively stop said wheel and hold it against further forward movement until the auxiliary frame produces an upward movement of the rack frame B, which releases the segment H, from the registering wheel C, and permits it to drop back one notch when it is again thrown into engagement with said registering wheel as the rack frame is released and drops to its normal position. It will thus be seen that means are provided for limiting the movement of each registering wheel to a single notch or unit unless said wheel be thrown into engagement with its operating rack and moved thereby when the same has been released by the depression of a key in the series to which said registering wheel belongs.

In cash registers as usually organized a possibility of manipulating the registering mechanism exists when the machine has been utilized up to its full capacity, that is to say when each registering wheel has made a complete revolution. In such case the wheels would be brought back to zero or the starting point, but it would be possible to register a less amount than was in the cash receptacle and abstract the difference. To provide against a possibility of this kind I attach a locking mechanism adapted to be operated when the machine has been used up to its full capacity, so as to automatically lock all the keys and prevent any further use of the machine until it has been examined by the proprietor and the wheels again returned to their normal positions. This I accomplish as follows: On the registering wheel C, I place a lug or projection L, adapted, when the said wheel has made a complete revolution, to contact with a pivoted lever L', which rests at its inward extremity against a moving bar $L^2$, supported at each end by pivoted arms $L^3$, in the main frame and connected to a spring $L^4$, adapted, as the lever L' is moved from contact with the bar $L^2$, to force said bar backwardly until it contacts with the vertical stems of the bell-crank levers $a'$, to which the operating keys are attached. When thus moved spring catches $L^5$, are adapted to drop behind the bar $L^2$, and hold it firmly in this position. In the normal position the bar $L^2$, rests just behind the bell-cranks $a'$, and does not interfere with the operation thereof. The engagement of the lug or projection L, with the pivoted lever L', withdraws said lever from contact with the bar $L^2$, which is moved forward by the spring $L^4$, until it contacts with the bell-crank levers $a'$, being held in this position by the detents or spring catches $L^5$.

To provide for sounding an alarm as the cash receptacle is opened, a small gong $m$, is provided in the rear of the cash receptacle and connected in a suitable manner to the main frame of the machine. Hanging loosely in the said frame in front of said gong is a hammer $m'$, and immediately back of said hammer is a spring actuated lever $m^2$, adapted to be operated against said hammer $m'$, by a spring $m^3$, until said lever $m^2$, comes in contact with a stop $m^4$. A spring actuated catch $m^5$, on the back of the cash receptacle is adapted to engage with the lever $m^4$, and as the cash receptacle is opened, draw back said lever until the angle thereof is sufficient to release it from said catch when it strikes the hammer and forces it against the gong, thus sounding an alarm.

Figure 3:
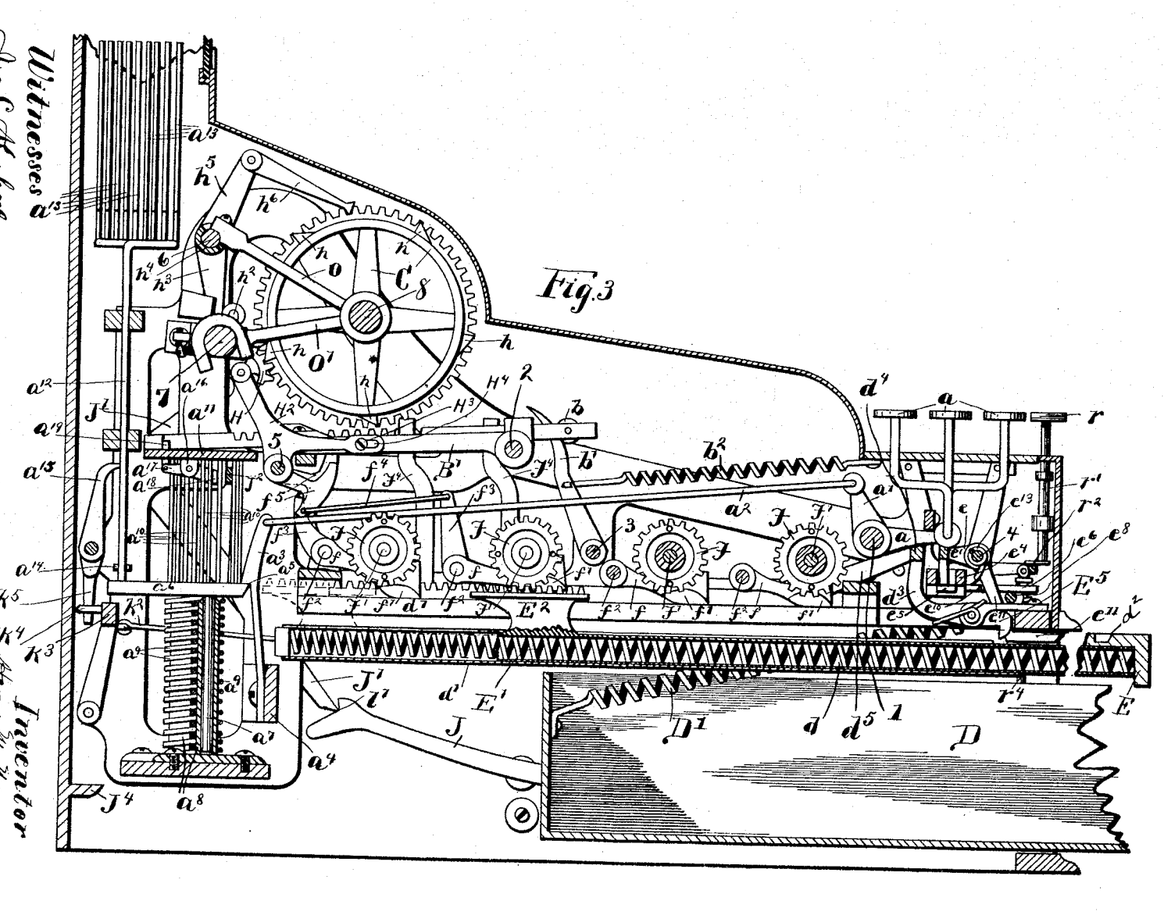
Fig. 3 is a transverse sectional view of the same with the drawer shown partly withdrawn.
Figure 12:
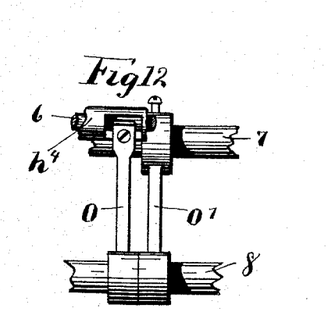
Fig. 12 is a detail view of a bracing and supporting device, in connection with the shaft for the registering wheels.

In order that the respective parts of the registering mechanism and the transferring mechanism connected thereto shall be held firmly in their proper positions, between the respective shafts 6, 7 and 8, I use brace connections O O', which extend from suitable sleeves or bearings between the respective rods or shafts, as shown in Fig. 3 and in detail in Fig. 12. These brace connections hold the said shafts in their proper relative positions and prevent any springing of the parts, which might result in an error in the adding or registering of the said wheels.

It is obvious that the registering wheels may be supplied with any suitable number of teeth. In the machine which I have described I have provided each of said wheels with forty teeth, which teeth are arranged in series of ten, so that every fourth revolution of one wheel produces a movement of one notch of the next succeeding wheel, the parts in this respect being substantially the same as in my prior application referred to.

Pivoted to each side of the receptacle D, is a lever J, operated by a spring $l$, and provided at its outer extremity with a shoulder $l'$, adapted to contact with a pivoted bell-crank lever J'. These respective bell-crank levers J', are each connected by a link connection $l^2$, to the opposite extremities of a bar $J^2$ which extends transversely across the entire device above the respective cross bars or sleeves $a^6$. (See Figs. 2, 3 and 4.) Connected to the upper end of the bell-crank J', are springs $J^5$, which serve to hold said bell-crank in the normal position shown in Fig. 3, and indicated by dotted lines in Fig. 2, with the bar $J^2$, elevated, but as the drawer is moved inwardly the lever J, contacts at the shoulder $l'$, with the bell-crank lever J', and is carried back to the position shown in Fig. 2. The beveled end of the lever J, engages with a beveled stop projection $J^4$, so that the further inward movement of the said drawer causes an outward movement of the lever J, which releases the bell-crank J', and permits it, through the medium of the spring $J^5$, to return to its normal position.

To provide for releasing the indicators which have been elevated by the depression of a key or keys, I provide in one of the pipe bearings $d$, of the frame E, a pin or projection $k$, adapted to contact with a hook shaped end $k'$, of a rod $k^2$, which in turn is connected at its rear end to a pivoted bar $k^3$, extending entirely across the machine. This bar $k^3$, is provided at invervals with yokes $k^4$, which engage with projecting arms $k^5$, on the catches $a^{15}$, adapted to engage with the projections $a^{14}$, on each of the indicator stems of the series. The result of this construction is that the indicators raised by the depression of a key are held in their normal positions after the bar $J^2$, has returned the stop-pins to their normal positions, the said indicators being released so as to drop by gravity to their normal positions, when the auxiliary frame is moved to the limit of its outward stroke in registering or indicating the next succeeding amount.

To provide for opening the cash receptacle for making change or for other purposes without operating the registering mechanism or any portion thereof, I provide a separate drawer opening key $r$, marked "change" in Fig. 1. This key has a downwardly projecting stem $r'$, journaled in suitable bearings at the front of the casing and adapted to rest on a horizontal bar $r^2$, which extends entirely across said casing and is provided at each end with arms $r^3$, by means of which it is pivoted to the main frame. Connected to the bar $r^3$, at each end and projecting downwardly therefrom is a small push rod $r^4$, held in its normal forward position by a spring $r^5$, and resting at its lower end against a projecting lug $c'$, on the spring bolts $c$. (See Figs. 5 and 6 for detail.) By depressing the key $r$, the spring bolts $c$, are pressed downwardly until they stand flush with the top of the drawer. The drawer is thus released from the auxiliary frame E, and is opened by the drawer springs D'. Means are thus provided by which the drawer may be opened at any time without in any way disturbing or affecting the registering mechanism. When the drawer is closed the beveled edges of the spring bolts $c$, bearing against the front edge of the frame E, cause said bolts to be pressed downwardly until the drawer is in its normal position, when they again engage the frame E, and are ready for operation.

The operation of the machine as thus described is briefly as follows: On depressing a key in any series, the stop-pins $a^{10}$, corresponding to said key, are released through the medium of the bell-crank $a'$, rod $a^2$, and spring catch $a^3$. An upward movement of this stop-pin and the bar $a^6$, to which it is connected, causes the registering rack B, to be released by the contact between said bar $a^6$, and the T-shaped pivoted lever $a^{17}$, which withdraws the pin $a^{19}$, from contact with the T-shaped head of said registering rack B. When thus released the said rack is drawn forward by the spring $b^2$, until it contacts with the stop-pin $a^{10}$. The depression of a key $a$, through the medium of the bar $d^4$, releases the spring catch $E^5$, which releases the auxiliary frame E, which is forced outwardly by the spring E', thus releasing the drawer D, which has been held by the spring bolt $c$, resting in contact with the said frame E. The outward movement of the auxiliary frame causes the rack segment $E^2$, connected thereto to successively engage with the pinions F, which are thus partially revolved, and through the medium of the pinions $F^2$, withdraw the racks $F^3$. As the drawer and frame are pushed into their normal positions, the contact of the rack segment $E^2$, produced through the pinions $F^2$, a forward movement of the racks $F^3$, through the medium of the upwardly projecting arms or spurs $F^4$, contacting with the projections $F^5$, on the registering racks B, carry said racks back to their normal positions, at the same time the engagement of the camway $E^3$, with the respective pivoted levers $f$, causes each of the rack frames B', to be successively raised so as to bring the operating rack B, in contact with its registering wheel while being moved back to its normal position, thus moving said registering wheel the number of teeth determined by the inward movement of the rack against the stop-pin. If in the movement of any wheel it is carried back so as to bring the projections $h$, in contact with the sliding bar $h'$, the registering wheel of the next succeeding wheel is moved one notch through the medium of the projecting arm $h^3$, and sleeve $h^4$, lever $h^5$, and bar $h^6$, the movement of said wheel being limited by the stop segment H, as before described. The releasing of the bar $a^6$, and the stop-pin $a^{10}$, also raises the indicator corresponding to the key depressed, until the projection $a^{14}$, of the stem $a^{12}$, is engaged by a pivoted catch $a^{15}$. As the frame E, approaches the limit of its outward stroke, a small pin $k$, engages with a hook shaped end $k'$, of a connecting rod $k^2$, which is attached at its other end to a pivoted bar $k^3$, having at suitable intervals yokes or staples $k^4$, which engage downwardly projecting arms $k^5$, on the catches $a^{15}$, thus releasing all the indicators save those which are held up by the elevated cross bars $a^6$. As the auxiliary frame and cash receptacle are closed to their normal positions, the pivoted lever J, on the cash receptacle engages with the bell-crank lever J', thus producing a downward movement of the transverse bar $J^2$, connected thereto, which forces all of the cross bars $a^6$, and the stop-pins to their normal positions where they are engaged by the respective spring catches $a^3$. As the cash receptacle nears the limit of its inward stroke, the pivoted lever J, thereon, comes in contact with the cam projection $J^4$, on the back of the ways, which releases the said lever J, from the bell-crank arm J', which is returned to its normal position by the spring $J^5$, all the parts being thus returned to their normal positions.

It is obvious that the parts thus described admit of various modifications in their construction. I do not, therefore, limit myself to the exact constructions shown and described, but claim broadly as my invention.

1. In a cash register, a registering wheel, and a series of keys, a reciprocating rack adapted to engage said registering wheel, and a series of stop-pins each controlled by one of the keys of said series, each of said keys being adapted to release said rack, and cause it to move to the position governed by the stop-pin connected to said key, and means for positively forcing said rack into engagement with said wheel and returning it to its normal position, thus registering the amount indicated by said key, substantially as specified.

2. In a cash register, a registering wheel and a reciprocating rack adapted to engage said wheel, a series of keys controlling a series of stop-pins adapted to limit the movement of said rack and an auxiliary mechanism released by each of said keys, adapted, when returned to its normal position, to positively force said rack into engagement with the registering wheel and return the same to its normal position, thus revolving said wheel a number of units corresponding to the number on said keys, substantially as specified.

3. In a cash register, the registering wheel and the rack adapted to engage the same, a series of stop-pins adapted to limit the movement of said racks, a spring actuated bar for raising said stop-pins, an indicator loosely connected to said bar and a series of keys, one for each stop-pin, adapted, when depressed, to release said bars and permit the indicators and stop-pins to be elevated, and a releasing mechanism common to all of said bars adapted to be contacted by each of said bars and release the registering rack, substantially as specified.

4. In a cash register, a series of registering wheels, and an operating rack for each of said wheels, a series of keys for each registering wheel, each of said keys being adapted to control a spring actuated stop-pin to limit the movement of said registering rack, a series of indicators one for each pin, also controlled by said keys and a releasing lever common to said series adapted, as any key of said series is depressed, to release said rack and permit it to move in contact with said stop-pin, and an auxiliary mechanism common to all of said registering wheels, adapted to be released by the depression of a key in any series, said auxiliary mechanism being adapted to produce a positive longitudinal and upward movement of each of said registering racks in successive order, as said mechanism is returned to its normal position, substantially as specified.

5. The combination with a series of registering wheels and a reciprocating rack for each of said wheels, a series of keys for each of said racks, a spring actuated stop-pin controlled by each of said keys, a releasing lever common to all the stop-pins of one series, adapted, as one of said pins is released, to release said registering rack, a spring for moving said rack when so released until it contacts with one of said pins, and an auxiliary operating mechanism, common to all of said racks and adapted to be released by the depression of any key in any series, said auxiliary mechanism being adapted to produce an upward and longitudinal movement of each of said racks, as said auxiliary mechanism is returned to its normal position, substantially as specified.

6. The combination with a series of registering devices and a series of keys for each of said registering devices, an intermediate spring actuated auxiliary mechanism adapted to be released by any key of any series and to move said registering devices when returned to its normal position, and a spring actuated cash receptacle independent of said auxiliary mechanism but normally connected thereto, and means, substantially as described, for disconnecting said cash receptacle from said auxiliary operating device, to permit said cash receptacle to open independently thereof, substantially as specified.

7. In a cash register and indicator, a series of registering devices one for each denomination to be registered, each of said devices being provided with a registering wheel, an operating reciprocating rack, a series of spring actuated stop-pins arranged in successive order to limit the movement of said rack and a series of keys each adapted to control one of said stop-pins, an indicator for each key loosely connected to each of said stop-pins, an engaging projection for holding said registering rack, and an operating lever connected to said engaging projection and adapted to be contacted by any of the stop-pins in said series when released, and means for moving said rack when so released to cause it to contact with said stop-pin, substantially as specified.

8. The combination with the registering wheel and the reciprocating rack, of a series of T-shaped bars each provided with a stop-pin and an indicator, spring catches for controlling said bars, and keys connected to said spring catches, an engaging projection for holding said rack and a T-shaped lever connected to said projection adapted to be engaged by each of said T-shaped bars, and a spring connected to said rack to cause it to move in contact with any of said stop-pins when released by the operation of one of said bars, substantially as specified.

9. The combination with a series of registering wheels and a reciprocating rack for each of said wheels, a series of keys for each of said racks, and mechanism connected with each of said keys to release the said rack, a series of auxiliary racks one for each registering rack and a series of pinions arranged in successive order and each connected through suitable means to one of said auxiliary racks, a spring actuated rack segment adapted to be released by the depression of any key in any series and successively engage said pinions, and a cam projection on said rack segment adapted, through suitable mechanism, to produce an upward movement of the registering racks at the same time the said segment is in contact with the pinion which controls the auxiliary rack belonging thereto, and means for producing a positive movement of the registering rack to its normal position when the auxiliary rack is moved by the operation of said rack segment and pinion substantially as specified.

10. The combination with a series of registering wheels and a reciprocating rack for each of said wheels, a series of keys for each registering wheel, each adapted to release and limit the movement of said registering rack, a spring actuated rack segment adapted to be released by any key in any series and a series of pinions arranged in successive order along the line of travel of said rack segment, and intermediate mechanism between each of said pinions and said registering racks to cause a positive movement of said registering racks to their normal positions, substantially as specified.

11. The combination with a series of registering wheels, and a registering rack for each wheel, a series of keys adapted to release and control the movement of said rack, a reciprocating spring actuated rack segment adapted to be released by any key in any series, a series of pinions arranged in successive order along the line of travel of said rack segment and connected by suitable mechanism to each of said racks, and independent means for forcing said registering racks into engagement with the registering wheels when the rack segment is engaged with the pinion controlling said registering wheel and rack, substantially as specified.

12. In a cash register, a series of registering wheels and a series of registering racks one for each wheel but normally disconnected therefrom, a series of keys for each wheel and rack, adapted to release and control the movement of said rack independent of said wheels and a spring actuated reciprocating rack segment adapted to be released by any key of any series, a series of pinions in the line of travel of said rack segment adapted to be successively engaged thereby, and connecting mechanism from each of said pinions to each of said operating racks, and independent means for producing an upward movement of said registering racks to cause the same to be engaged with the registering wheel during the time the rack segment is in engagement with the pinion controlling said registering rack, when turning to its normal position, substantially as specified.

13. The combination with a registering wheel, a reciprocating rack adapted to engage therewith, a series of key levers and a series of spring actuated stop-pins, one stop-pin for each key, said keys being adapted to release said stop-pins and limit the movement of said rack, a normally closed cash receptacle and means connected with said cash receptacle for returning said stop-pins to their normal positions when said receptacle is open and closed, substantially as specified.

14. The combination with the registering wheels and a reciprocating rack one for each wheel, an oscillating frame supporting said rack, a series of keys for each registering wheel, adapted to set into operation mechanism which releases and limits the movement of said rack, and an auxiliary operating device also released by said key, adapted, when returned to its normal position, to produce an upward movement of said reciprocating frame and a backward movement of said rack, to cause said rack to engage and move said registering wheel, substantially as specified.

15. The combination with the registering wheels, of the spring actuated reciprocating racks, one for each wheel, each of said racks being supported in a pivoted frame in proximity to said wheel, a series of keys for each of said registering wheels, each adapted to set into operation intermediate devices to release and limit the movement of said rack, and an auxiliary mechanism also released by said key adapted, through suitable means, to elevate said pivoted frame and produce a backward movement of said rack, when returned to its normal position, substantially as specified.

16. The combination with a registering wheel and a spring actuated rack in proximity thereto, but normally disconnected therefrom, a pivoted frame for supporting said rack, a series of keys adapted to set into operation devices for releasing and controlling the movement of said rack and a reciprocating spring actuated rack segment also released by each of said keys, said rack segment being adapted, as it is returned to its normal position, to set into operation mechanism which produces an upward movement of said pivoted frame and a backward movement of said rack to its normal position, whereby the registering wheel, is caused to turn a number of teeth corresponding to the key depressed, substantially as specified.

17. The combination with a registering wheel and a spring actuated reciprocating rack normally disconnected therefrom and a movable frame for supporting said rack, a series of keys each adapted to set into operation mechanism for releasing said rack and limiting the movement thereof, and an auxiliary mechanism also released by said key and an intermediate connection between the auxiliary mechanism, a movable frame and rack adapted to cause said frame to move toward said wheel and the said rack moved backward to its normal position, as the auxiliary mechanism returns to its normal position, substantially as specified.

18. The combination with a toothed registering wheel and a rack for operating the same, a movable supporting frame for said rack, of a stop device adapted to engage the teeth of said registering wheel, said stop device being connected to said frame so as to be moved out of contact with said registering wheel when the rack is moved into gear therewith, substantially as specified.

19. The combination with the registering wheel and its operating rack, of a gear segment having a limited movement, normally engaging said registering wheel, said gear segment being so connected to said rack that the gear segment is thrown out of mesh with said registering wheel, when the rack is thrown into mesh therewith, substantially as specified.

20. The combination with the registering wheel and operating rack normally disconnected therefrom, a pivoted frame for supporting said rack, a gear segment having a limited movement supported on a pivoted arm in proximity to said pivoted frame, so that said gear segment is normally in mesh with said registering wheel, and a pivoted connection between said arm and frame, whereby the said gear segment is thrown out of mesh with the said registering wheel when the frame is moved to carry the rack into mesh therewith, substantially as specified.

21. The combination with a series of registering wheels and the devices for operating the same normally disconnected therefrom, and transferring mechanism operated by one wheel to produce a movement of the next succeeding wheel, and a gear segment having a limited movement and normally in gear with said registering wheels, and means, substantially as described, for withdrawing said segment from mesh with said registering wheel, as the registering devices are connected thereto, substantially as specified.

22. The combination with the registering wheel having peripheral teeth and an operating rack having corresponding teeth but normally disconnected therefrom, a series of keys and a series of stop-pins one for each key, adapted, as a key is depressed, to release said rack and limit the movement thereof, an auxiliary reciprocating actuating mechanism also released by said key, and intermediate connecting mechanism, adapted, as said auxiliary device is returned to its normal position, to produce an upward and backward movement of said rack to cause it to engage with said registering wheel and turn the same as it is moved to its normal position, substantially as specified.

23. The combination with a series of registering wheels and a series of operating racks, one for each wheel, but normally disconnected therefrom, operating keys arranged in series for each registering wheel, each key of said series being adapted to set into operation mechanism for releasing and limiting the movement of said rack and each key of all the series being adapted to set into operation auxiliary mechanism, actuating devices for each of said racks adapted to be successively operated by the auxiliary mechanism as it is returned to its normal position and cause said racks to be successively moved into engagement with said registering wheels and held in mesh therewith while being returned to their normal positions, substantially as specified.

24. The combination with the registering wheels and their operating racks, of the auxiliary racks one for each operating rack, and engaging projections on said auxiliary and operating racks to cause them to move together when returning to their normal positions, a series of keys adapted to release and determine the forward movement of each of said racks and a series of pinions arranged in successive order and each connected to one of said auxiliary racks, a reciprocating rack segment, adapted, when reciprocated, to successively operate said pinions, pivoted levers for effecting a lateral movement of each of said operating racks, and a cam projection on said rack segment adapted to successively operate said pivoted levers in returning to their normal positions, to cause the said operating racks to be moved into engagement with said registering wheels during the time the said auxiliary racks are being returned to their normal positions, substantially as specified.

25. The combination with a registering rack, a wheel, the spring actuated stop-pins and their actuating keys, of a transverse bar arranged in proximity to and adapted to contact said stop-pins, and bell-crank levers connected at each end of said bar, a normally closed cash receptacle having pivoted arms adapted to contact with said bell-crank levers to produce a movement of said bar as the cash receptacle is being returned to its normal position, an engaging projection adapted to produce a limited movement of said pivoted arms to cause them to release said bell-crank prior to the time the cash receptacle reaches the limit of its forward movement, substantially as specified.

26. The combination with a series of independently operating registering devices and a series of keys for operating each of said registering devices, transferring mechanism adapted to produce a limited movement of one wheel from a definite movement of the next preceding wheel, a stop bar arranged in proximity to each of said keys, adapted, when released, to lock all of said keys, retaining devices for holding said bar in its normal position, and means, substantially as described, connected with one of said registering devices to operate said retaining device, and thus release said stop bar, when said registering device has reached the limit of its registering capacity, substantially as specified.

27. The combination with a series of registering wheels having connecting mechanism so that a definite movement of one registering wheel produces a limited movement of the next succeeding registering wheel, a series of keys and connecting mechanism for operating each of said wheels, a stop bar arranged in proximity to the connecting mechanism of each of said keys, adapted, when released, to lock all of said keys, said bar being normally retained by a pivoted lever, and a cam projection on the registering wheel of the highest denomination, adapted, upon a complete revolution, to operate said retaining lever and release said locking bar, substantially as and for the purpose specified.

28. The combination, in a cash register, of a normally closed cash receptacle and a normally closed register actuating mechanism to which said cash receptacle is normally connected, independent spring devices for operating said cash receptacle and said register actuating mechanism, a series of keys each adapted to release said register actuating mechanism and thus release said cash receptacle, an independent key for disconnecting said cash receptacle from said register actuating mechanism, and thus release said receptacle and permit it to open independent of the register actuating mechanism, substantially as specified.

29. The combination with the registering wheels and their actuating mechanism, and a series of keys controlling the same, a series of indicators one for each key also controlled by said keys, a movable stop for engaging said indicators and holding them in their elevated positions when actuated by said key, and auxiliary mechanism for actuating the registering devices also released by said keys and a connection from the indicator stop to said auxiliary mechanism, whereby the said indicators are released by the outward movement of said auxiliary device, substantially as specified.

30. In a cash register, the combination, with a series of actuating keys, of a pivoted U-shaped frame normally in contact with each of said keys, said frame being provided with a beveled projecting spur operating through an opening in a stationary bar, a sliding bolt arranged beneath said stationary bar, adapted to be moved to a limited extent by the beveled face of said spur, when a key is depressed, a spring catch for holding said bolt in its normal position, said catch being adapted to be released by a limited movement of said bolt, spring actuating devices for moving said bolt, when released, to cause it to move under said spur by the reciprocating movement of said spur caused by the depression of a key, substantially as specified.

31. In a cash register, the combination, with a series of registering levers, of a spring actuated pivoted bar normally in contact with all the keys of the series, said spring actuated bar being provided with a projecting spur having a beveled face, a spring actuated sliding bolt adapted to contact with the beveled face of said spur, and thus be moved to a limited extent, when said spur is moved by the depression of a key, a spring catch for holding said bolt in its normal position, said catch being adapted to release said bolt, when said bolt is moved backwardly to a limited extent, and thus permit said bolt to be forced forward under said spur, when said spur returns to its normal position, and means, substantially as described, for returning said bolt and said catch to their normal positions, so as to release said bar and thus said keys, substantially as and for the purpose specified.

32. The combination with the registering wheels and the racks adapted to engage and move the same, pivoted frames for supporting said racks, a series of keys for releasing and controlling the forward movement of said racks, and a reciprocating actuated mechanism also released by said keys, a series of pivoted levers connected to said pivoted frames, each having a cam projection adapted to be engaged on one side of the outward movement of said actuating mechanism and on the opposite side by the inward movement thereof, whereby said pivoted frames and said actuating racks are held out of engagement with the said registering wheel during the outward movement of said mechanism and in engagement therewith during the inward movement thereof, substantially as specified.

33. The combination with a series of registering wheels, a normally disconnected registering mechanism, a series of keys for controlling said registering mechanism, a normally closed cash receptacle and an auxiliary intermediate frame having an outline corresponding to the outline of said cash receptacle, independent keys for operating said receptacle and frame, said receptacle being normally connected to said frame and operated therewith when said frame is released, but provided with independent devices to accomplish its release independent of said frame, and means connected with said frame for actuating said registering wheels by the inward movement thereof, substantially as specified.

34. The combination with the registering wheels, the registering devices connected therewith, the keys for controlling the same, a series of spring actuated indicators and a stop lever common to all the indicators of a series, an auxiliary sliding frame adapted to be released by any key in any series, said sliding frame, through intermediate mechanism, being adapted to actuate said registering wheels, and an independent connection from said frame to said stop lever, whereby the indicators previously engaged thereby are released on the outward movement of said frame, substantially as specified.

In testimony whereof I have hereunto set my hand.

HARRY M. NEER.

Witnesses:
R. D. BALDWIN,
J. J. HOPPES.